UNITED STATES PATENT OFFICE.

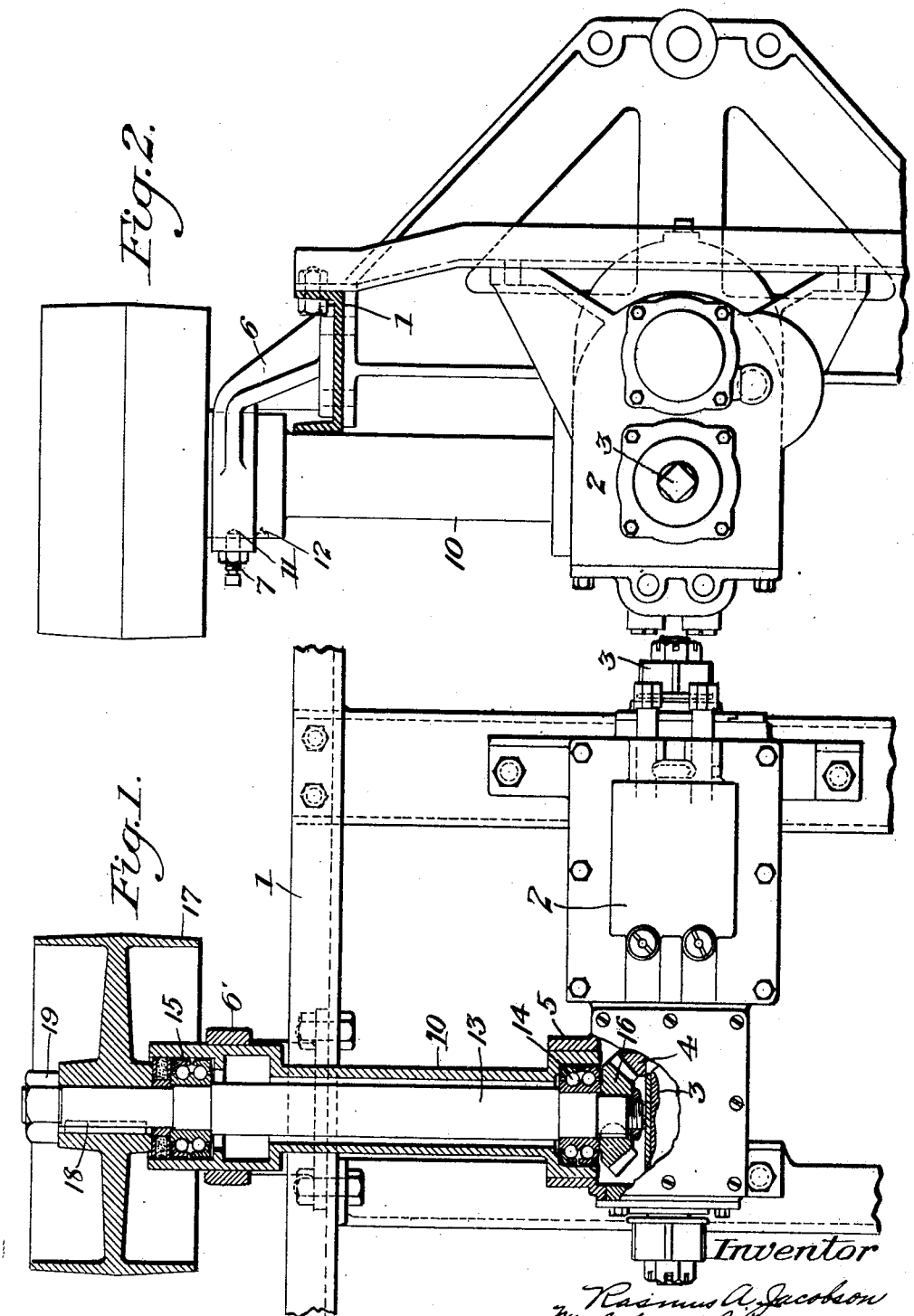

RASMUS A. JACOBSON, OF MINNEAPOLIS, MINNESOTA.

POWER-DERIVING ATTACHMENT FOR AUTOMOTIVE VEHICLES.

1,371,375.  Specification of Letters Patent.  Patented Mar. 15, 1921.

Application filed January 10, 1920. Serial No. 350,671.

*To all whom it may concern:*

Be it known that I, RASMUS A. JACOBSON, a citizen of the United States, residing at Minneapolis, county of Hennepin, State of Minnesota, have invented certain new and useful Improvements in Power-Deriving Attachments for Automotive Vehicles; and I do hereby declare the following to be a full, clear, and exact description of the invention, such as will enable others skilled in the art to which it appertains to make and use the same.

The invention relates to a simple, durable, cheap and efficient attachment or auxiliary power device for use in connection with automotive vehicles, and more particularly with industrial trucks to permit power to be taken from the power-plant of the vehicle for driving machinery or performing other useful work. It has been proposed heretofore to equip tractors and similar power driven devices with an auxiliary shaft adapted to be connected with the driving shaft of the engine or some other rotating element of the power plant by means of a clutch, or, in the alternative, to connect the auxiliary shaft permanently to the driving mechanism. The former arrangement involves more or less complicated and expensive mechanism, which is liable to derangement, and the latter form of installation results in a useless waste of power and wear on the parts by reason of the fact that the auxiliary or power shaft is constantly driven whenever the engine of the machine is operating. The present invention is designed to obviate all of these difficulties by providing a simple auxiliary shaft provided with a power transmitting element at its outer end and a gear fast to its inner end, said shaft being journaled in an axially movable sleeve mounted in bearings carried by the machine so that when said sleeve is moved in or out, the gear on the end of the shaft is engaged with or disengaged from a driving gear interpolated in the gear set of the vehicle and preferably mounted on the main shaft of the transmission, so that when the sleeve and its associated shaft is retracted, to disengage the gears, the auxiliary shaft is inactive and is neither wasting power nor producing wear on the parts, and when the sleeve is moved inwardly to bring the gears into mesh, the auxiliary power shaft is driven in consonance with the speed of the driving element to which it is geared and serves to transmit power by a belt or other power-transmitting element as described.

The invention is illustrated in the accompanying drawing, in which,

Figure 1 is a plan view, partly in section, of a portion of the chassis and the transmission gear set of a tractor or similar automobile vehicle.

Fig. 2 is a front elevation of the same.

Referring to the drawings, 1 indicates the chassis or frame of the vehicle as a whole, upon the transverse members of which is mounted the casing 2 of the transmission gear set, the main shaft 3 of which is adapted to be driven from the engine shaft, as will be understood. On the rear portion of the shaft 3 is fixed a bevel gear 4, which partakes of the movement of said shaft both as to speed and direction.

On the side of the gear casing 2, there is provided an annular boss 5, constituting a bearing and on the outer face of one of the side bars of the chassis is secured a bracket 6 having a similar bearing 6' in alinement with bearing 5, the longitudinal axis of the two bearings thus formed extending at right angles to the axis of the shaft 3.

Slidably mounted in the bearings 5 and 6' is a spool-like sleeve 10 in which is journaled, in suitable antifriction bearings 14 and 15, an auxiliary or stub shaft 13 to the inner end of which is secured a bevel gear 16 adapted to mesh with the bevel gear 4 on shaft 3 of the transmission. On the outer end of the shaft is keyed a band wheel, pulley or equivalent power-transmitting element 17, locked to said shaft by a key 18 and set nut 19. While said shaft 13 is freely rotatable in its bearings in the sleeve 10, the sleeve and the shaft have little or no relative axial movement, but always move together in an axial direction. The sleeve, however, is freely slidable in the bearings 5 and 6', so that when the sleeve is moved inward in its bearings, the gear 16 is brought into meshing engagement with driving gear 4 on shaft 3, and conversely, when the sleeve is moved outward, these gear elements are disengaged.

In order to lock the sleeve in both positions of adjustment, the bearing 6' is provided with a set screw 7, adapted to engage one or the other of two seating sockets 11 and 12 on the outer end of the sleeve 7. When the set screw engages socket 11, the sleeve and its associated shaft 13 is locked in active or driving position, and when said screw engages socket 12, the device is locked in inoperative relation and the shaft is idle.

While the invention is illustrated as applied to effect driving connection between the auxiliary shaft and the transmission set of the vehicle, it will be understood that it is not limited to this particular application, but the auxiliary power shaft with its bearing sleeve and supporting bearings for the latter may be applied at any appropriate or desired portion of the vehicle where a suitable driving gear may exist or may be applied.

What I claim is:—

1. A power deriving attachment for automotive vehicles, comprising a bearing sleeve mounted for longitudinal adjustment on the vehicle frame, a shaft journaled in said sleeve and adjustable therewith, a gear on the end of said shaft adapted to be moved into and out of mesh with a driven gear of the vehicle, and means to lock the said sleeve against longitudinal movement.

2. A power deriving attachment for automotive vehicles, comprising a bearing sleeve slidably mounted in bearings on the vehicle frame normal to a driving shaft of the vehicle, a shaft journaled in said sleeve and adjustable therewith, a gear on the end of said shaft adapted to be moved into and out of mesh with a gear on the vehicle shaft, and means to lock said sleeve against longitudinal movement.

3. In a tractor or automotive vehicle having a gear set and a casing therefor, bearings on the casing and machine frame respectively, a sleeve slidably mounted for longitudinal movement in said bearings, a shaft journaled in said sleeve, a gear on the inner end of the shaft, and a driving gear connected with the vehicle gear set with which the gear on said shaft is caused to engage or disengage as the sleeve aforesaid is moved in or out in its bearings.

4. In a tractor or like automotive vehicle having a gear set, alining bearings carried by the machine frame, a sleeve slidably mounted in said bearings, a shaft journaled in said sleeve and sliding therewith, a gear on the inner end of the shaft, a driving gear connected with the vehicle gear set with which the gear on the shaft is engaged and disengaged as the sleeve is moved in or out in its bearings, and means to lock said sleeve against longitudinal movement.

5. In a tractor, a bevel gear on the main shaft of the transmission, alining bearings on the transmission casing and the machine frame, a sleeve slidably mounted in said bearings, a power-transmitting shaft journaled in said sleeve, and a bevel gear on the end of said shaft adapted to be moved into and out of mesh with the gear on the transmission shaft as said sleeve is moved in or out.

6. In a tractor, a bevel gear on the main shaft of the transmission, alining bearings on the transmission casing and the machine frame, a sleeve slidably mounted in said bearings, a power-transmitting shaft journaled in said sleeve, a bevel gear on the end of said shaft adapted to be moved into and out of mesh with the gear on the transmission shaft as said sleeve is moved in or out, and means to lock said sleeve against longitudinal movement.

7. In a tractor, a bevel gear on the main shaft of the transmission, alining bearings on the transmission casing and the machine frame, a sleeve slidably mounted in said bearings, a power-transmitting shaft journaled in said sleeve, a bevel gear on the end of said shaft adapted to be moved into and out of mesh with the gear on the transmission shaft as said sleeve is moved in or out, and a set screw on the outer bearing to lock the sleeve against longitudinal movement.

In testimony whereof I affix my signature, in presence of two witnesses.

RASMUS A. JACOBSON.

Witnesses:
J. C. YENNY,
A. H. TIMMERMAN.